United States Patent [19]

Clovis et al.

[11] 4,041,107
[45] Aug. 9, 1977

[54] THERMALLY STABLE POLYPHOSPHONATES AS FLAME RETARDANTS

[75] Inventors: James S. Clovis; Francis R. Sullivan, both of Warminster, Pa.

[73] Assignee: Rohm and Haas Company, Philadelphia, Pa.

[21] Appl. No.: 364,838

[22] Filed: May 29, 1973

Related U.S. Application Data

[62] Division of Ser. No. 139,948, May 3, 1971, Pat. No. 3,755,270.

[51] Int. Cl.$^2$ .................. C08F 259/00; C08F 275/00
[52] U.S. Cl. .................. 260/876 R; 260/2 P; 260/885; 260/DIG. 24; 526/275
[58] Field of Search ............ 260/80 P, 80 RS, 876 R, 260/2 P, DIG. 24, 937, 886, 885; 526/275

[56] References Cited

U.S. PATENT DOCUMENTS

3,155,630   11/1964   Emmons et al. .................. 260/80.71
3,155,705   11/1964   Emmons et al. .................. 260/937

*Primary Examiner*—Joseph L. Schofer
*Assistant Examiner*—Herbert J. Lilling
*Attorney, Agent, or Firm*—Michael B. Fein

[57] ABSTRACT

A thermally stable flame-resistant phosphonate polymer of the structure

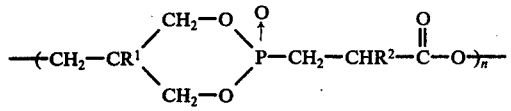

wherein $R^1$ is methyl or ethyl, $R^2$ is hydrogen or methyl and $n$ is 3 to 100, is formed by the reaction of acrylic or methacrylic acid with an alkyl bicyclic phosphite of the structure

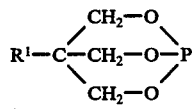

wherein $R^1$ is as above. The phosphonate polymer is useful in forming flame-resistant acrylic compositions such as molding powders and sheets from mixtures comprising the polymer and methyl methacrylate.

5 Claims, No Drawings

THERMALLY STABLE POLYPHOSPHONATES AS FLAME RETARDANTS

This is a division, of application Ser. No. 139,948 filed May 3, 1971 now U.S. Pat. No. 3,755,270.

The present invention relates to a novel thermally stable phosphonate polymer, to a process for making this polymer and to acrylic compositions such as molding powders and sheets of superior flame-resistant properties. The acrylic compositions comprise an addition polymer formed from a mixture containing the novel phosphonate compounds.

Hechenbleiker et al., U.S. Pat. No. 2,834,798, issued May 13, 1958 shows cyclic organic phosphite compounds based on the 1,3,2-dioxophospholane ring system useful as plasticizers and stabilizers for vinyl chloride resins and other plastics or as intermediates for forming other compounds. O'Brien et al., U.S. Pat. No. 2,934,555, issued April 26, 1960, teaches polymerizable acrylic or methacrylic esters of alkyl hydroxyalkyl-phosphonates useful as monomers for polymerization and copolymerization with other acrylic esters to yield flame-resistant plastics, coating, textile finishes, etc. Forsyth, U.S. Pat. No. 3,468,980; issued Sept. 23, 1969, teaches flame-retardant phosphonate polymers characterized by the unit

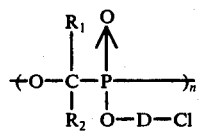

wherein $R_1$ and $R_2$ each contains up to 12 carbon atoms and represents alkyl, phenyl, phenylalkyl, alkylphenyl, alkenyl and alkoxycarbonyl. $R_1$ and $R_2$, taken collectively with the carbon atom to which they are attached, form an aliphatic ring of 5 to 7 carbon atoms. This aliphatic ring may be saturated or monounsaturated. It is preferred that the total number of carbon atoms in $R_1$ plus $R_2$ be no greater than 17. D represents an alkylene group of 2 to 3 carbon atoms or the alkyl-substituted alkylene group wherein the alkylene portion contains 2 to 3 carbon atoms and the alkyl substituents total up to 8 carbon atoms. The polymers are useful for forming flame-resistant acrylic sheets.

The present invention relates to a thermally stable flame-resistant phosphonate polymer characterized by the structure

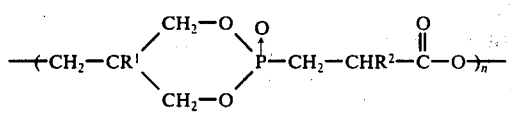

wherein $R^1$ is methyl or ethyl, $R^2$ is hydrogen or methyl and $n$ is 3 to 100. This flame-resistant polymer is formed by the reaction of acrylic or methacrylic acid with an alkyl bicyclic phosphite of the structure

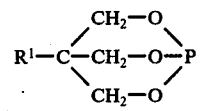

wherein $R^1$ is as defined as above. The alkyl bicyclic phosphite in turn may be formed by the reaction of phosphorous trichloride with a trimethylolalkane such as trimethylolpropane. See Emmons et al., U.S. Pat. No. 3,155,703, issued Nov. 3, 1964.

The reaction between the phosphite and acrylic or methacrylic acid is preferably carried out in polar solvents such as methylene dichloride, ethylene dichloride or tetrachloroethane. An exotherm occurs during the reaction and is best controlled by a gradual addition of the acid to the solution of the phosphite in refluxing solvent. The course of the reaction is followed by the decrease in acid number and increase in solution viscosity.

The structure of the product of the reaction between acrylic or methacrylic acid with a cyclic phosphite is difficult to predict. The expected route for the polymer formation would first involve addition of the bicyclic phosphite to the double bond of the α,β-unsaturated acid. The resulting zwitterion would undergo proton exchange to give (I).

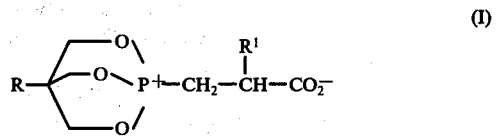

Polymer would form by participation of two molecules of I in an intermolecular Arbusov rearrangement.

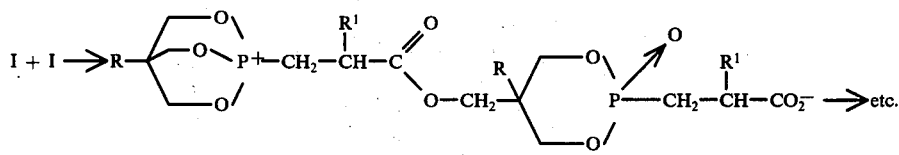

The expected route does not agree with the observations that the phosphite-acid reaction solution of this invention shows a strong alcoholic -OH and often an anhydride peak at 5.5μ. It is thought, although applicants do not intend to be bound by this explanation that the following reaction sequence occurs.

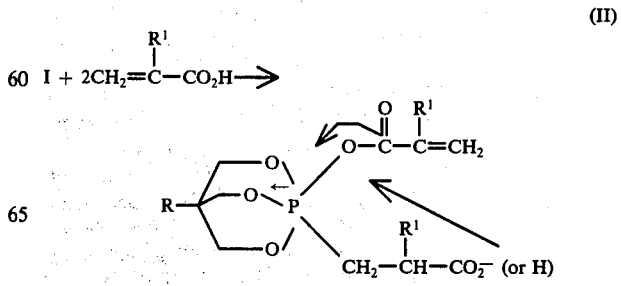

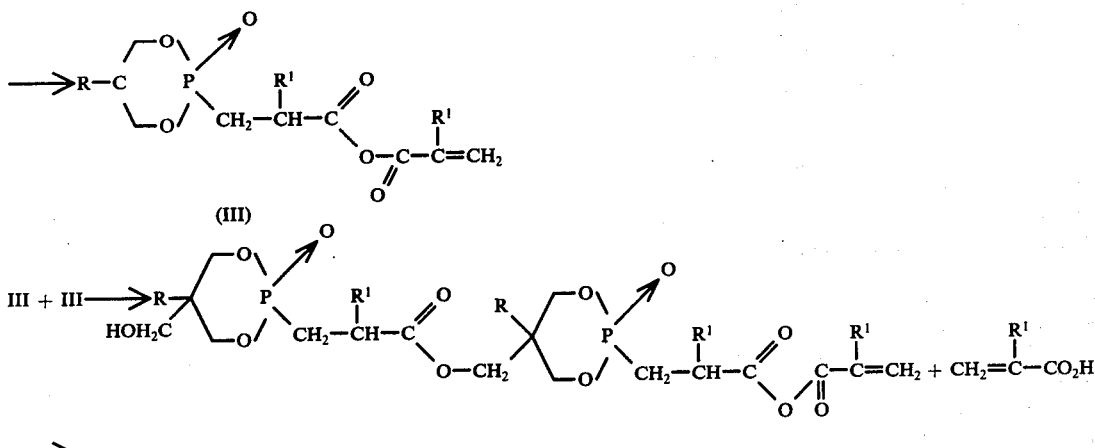

The acrylic composition of the present invention comprises an addition polymer formed from a mixture comprising; (a) at least 50 percent by weight of methyl methacrylate, and (b) 5 to 30 percent by weight of a flame-resistant phosphonate polymer defined by the general formula given supra. The mixture may additionally comprise 5 to 15 weight percent of a member selected from the class consisting of isobornyl acrylate, isobornyl methacrylate and mixtures thereof and/or up to 25 weight percent of an ethylenically unsaturated acrylic compound such as acrylic or methacrylic acids. The acrylic compositions of this invention may be formed by any process known in the art such as for example those referred to and shown in Forsyth, U.S. Pat. application, Ser. No. 819,484, filed Apr. 25, 1969, now U.S. Pat. No. 3,634,554, of Jan. 11, 1972.

The addition polymer may constitute the entire body of the composition or it may, for example, constitute the main body and serve as a binder in sheet form for common additives such as coloring dyes or pigments, release agents and other additives.

It is particularly notable that the phosphonate compositions of the present invention exhibit excellent thermal stability. This property is of particular importance where the compositions are to be incorporated into molding powders for processing by extrusion and molding operations. Commonly used commercial flame-retardant phosphonate compositions such as that prepared from ethylene chlorophosphite and acetone and that prepared from acetaldehyde, ethylene oxide and $PCl_3$ are not stable above about 180° C. while common processing temperatures for molding powders are near 250° to 275° C. The phosphonate compositions of the present invention are advantageously thermally stable at these processing temperatures.

A preferred embodiment of this invention is an acrylic composition, the main body of which is an addition polymer formed from a mixture comprising (a) at least 50 weight percent methyl methacrylate, (b) 10 to 30 weight percent of the flame retardent, and (c) 4 to 8 weight percent methacrylic acid or acrylic acid.

The class of other ethylenically unsaturated acrylic monomers useable in quantities up to 25 weight percent includes monoethylenically unsaturated acrylic compounds and polyethylenically unsaturated acrylic compounds. The unsaturated acrylic compounds constitute a class of compounds known in the art and include but are not limited to such compounds as methacrylic acid, acrylic acid, alkyl esters and substituted alkyl esters of acrylic acid and methacrylic acids, such as ethyl acrylate, butyl acrylate, 2-ethylhexyl acrylate, isobutyl acrylate, isobutyl methacrylate, ethylthioethyl methacrylate or acrylate, isobutyl acrylate, halogenated alkyl methacrylate, glycidyl methacrylate and the like; and di- or polyacrylic esters of diols and polyols, such as 1,3-butylene dimethacrylate, 1,3-butylene diacrylate, trimethylolpropane trimethacrylate and the like; acrylic nitriles, such as acrylonitrile, methacrylonitrile and the like. The inclusion of these ethylenically unsaturated acrylic compounds offers special characteristics that are particularly useful in some end-use applications. The inclusion of these compounds may improve physical properties including the heat distortion temperature and clarity. As examples, acrylic esters or polyethlenically unsaturated acrylic monomers may be utilized to improve high temperature heat resistance and other physical properties. Generally, the concentrations of the polyethylenically unsaturated monomers are maintained at a low level to allow thermoforming of the sheet or injection molding of molding powders. The ethylenically unsaturated acrylic monomers may be a mixture of two or more of the compounds from the class. The variation of the invention by including these ethylenically unsaturated acrylic monomers is within te gamut of this invention.

To assist those skilled in the art in the practice of the present invention, the following modes of operation are set forth as illustrations, parts and percentages being by weight unless otherwise specifically noted.

Example 1

This example illustrates the preparation.of the alkyl bicyclic phosphite. A slurry of 134 g. of trimethylolpropane (1.0 M) in 175 g. of ethylene dichloride is brought to reflux at a pressure of ca. 100 mm. to azeotrope off any water present. The reaction mixture is then cooled to 15° C. To the cooled and stirred solution which is kept under nitrogen is added dropwise 140 g. of $PCl_3$ (1.02 M) over a three-hour period. The reaction mixture is stirred overnight at room temperature after which time the solution is gradually heated to 70° C. and refluxed under vacuum (ca. 50 mm.) until the acid number is less than two. An IR spectrum of the solution is taken to insure the complete reaction of the —$CH_2OH$ groups. The distilled yield of phosphite is about 90%, which agrees well with the 92-98% solution yields obtained from bromine number determinations.

Example 2

This example illustrates the preparation of the flame-resistant phosphonate polymer of the present invention.

To the solution described above is added ca. 60 g of ethylene dichloride (EDC) and 2.34 g. of acetic anhydride (0.5 wt. % on final reaction solution). The solution is brought to reflux for one-half hour and is maintained under a nitrogen atmosphere. Seventy-two grams (1.0 M) of freshly distilled acrylic acid containing 2.34 g. of acetic anhydride is added over molecular sieves to the refluxing solution during a 4-hour period. The addition funnel is washed down with 20-25 ml. of EDC. The reaction solution is maintained under reflux for an additional 2 hours. The final solution acid number is between 25-35.

The product is recovered by stripping off the volatiles under vacuum in the presence of 1% benzyl chloride (by weight on solids) at 170-180° C. Alternatively, the product may be recovered by precipitation into ether. The product is a colorless to yellow solid with a softening point of 80-90° C. The yield is ca. 70% (precipitation) to about 95% (stripping).

Characterization of the product by elemental analysis, infrared spectra and unsaturation by bromine number indicates a product consistant with a polymer characterized by the structure

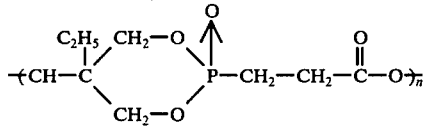

wherein $n$ varies from 3 to 10 depending upon the method of recovery. The product is characterized by excellent thermal stability.

Example 3

This example illustrates the preparation of acrylic sheet material of the present invention.

Fifteen grams of the product obtained from Example 2 is dissolved in 80 g. of methyl methacrylate and 5 g. of glacial methacrylic acid to which has been added 0.03 grams of a 25 percent solution of acetyl peroxide in dimethyl phthalate. The resulting solution is polymerized between glass plates. The resulting sheet has a self extinguishing rating by ASTM D635-56T.

Example 4

This example illustrates the preparation of the acrylic molding powder of the present invention.

Fifteen grams of the product obtained from Example 3 is dry blended with 85 g. of a copolymer of methyl methacrylate/methacrylic acid/ethyl acrylate; 92.1/5.9/2.0, $\eta_{EDC}$=0.8. The resulting blend is extruded into pellets which are injection molded into bars which are SE II by test UL 94.

Example 5

This example shows the improved thermal stability of the polymers of the present invention.

The following table shows weight loss and Acid Number change for samples of the flame-resistant phosphonate polymer prepared in Example 2, heated at 180° and at 200° C.

| Temp. ° C. | Time Minutes | Weight Loss Percent | Color | Acid Number |
|---|---|---|---|---|
|  |  |  | Yellow | 30 |
| 180 | 30 | 2.2 | Yellow | 33 |
| 180 | 60 | 2.5 | Yellow | 33 |
| 200 | 30 | 1.5 | Yellow | 33 |
| 200 | 60 | 1.8 | Yellow | 30 |
| 200 | 120 | 2.0 | Light Amber | Gel |

The change in Acid Number after 2 hours at 200° C. is found to be neglibible. Generally, thermal stability is found to be good up to 250° C. Above this temperature spontaneous decomposition occurs giving a char and volatiles.

What is claimed is:

1. As an article of manufacture, an acrylic composition comprising an addition polymer formed by polymerizing a mixture comprising:
   a. at least 50 weight percent of methyl methacrylate; and
   b. 5 to 30 weight percent of a flame-resistant phosphonate polymer defined by the general formula

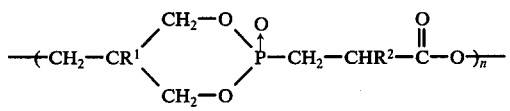

wherein $R^1$ is methyl or ethyl, $R^2$ is hydrogen or methyl and $n$ is 3 to 100.

2. The acrylic composition of claim 1 wherein the mixture additionally comprising a member selected from the group consisting of isobornyl acrylate, isobornyl methacrylate and mixtures thereof.

3. The acrylic composition of claim 1 wherein the mixture additionally comprising an ethylenically unsaturated acrylic compound.

4. The acrylic composition of claim 1 wherein the mixture additionally comprising acrylic or mthacrylic acid.

5. As an article of manufacture, an acrylic composition comprising an addition polymer formed by polymerizing a mixture comprising:
   a. at least 50 weight percent of methyl methacrylate; and
   b. 5 to 30 weight percent of a flame-resistant phosphonate polymer defined by the general formula

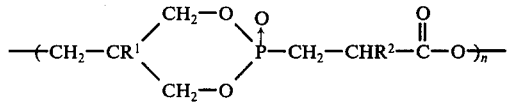

wherein $R^1$ is ethyl and $R^2$ is hydrogen and $n$ is 3 to 100.

* * * * *